```
┌─────────────────────────────┐
│      PREPOLYMER  OF         │
│  GLYCIDYL  METHACRYLATE,    │
│  METHACRYLONITRILE &        │
│  METHYL  METHACRYLATE       │
└──────────────┬──────────────┘
               │
┌──────────────┴──────────────┐
│        DIPHENOL,            │
│      DIEPOXIDE &            │
│        CATALYST             │
└──────────────┬──────────────┘
               │
┌──────────────┴──────────────┐
│        STRUCTURAL           │
│        THERMOSET            │
└─────────────────────────────┘
```

SANTOKH S. LABANA
SEYMOUR K. NEWMAN
JOHN F. SELLERS
INVENTORS

BY *John R. Faulkner*

*Olin B. Johnson*

ATTORNEYS

3,661,828
THERMOSET MOLDING POWDERS EMPLOYING GLYCIDYL METHACRYLATE AND DIPHENOLS

John F. Fellers, Livonia, Santokh S. Labana, Dearborn Heights, and Seymour X. Newman, Southfield, Mich., assignors to Ford Motor Company, Dearborn, Mich.
Filed June 5, 1970, Ser. No. 43,896
Int. Cl. C08f 45/36
U.S. Cl. 260—29.1 R                14 Claims

ABSTRACT OF THE DISCLOSURE

Novel thermosetting resin powders which can be molded to form products characterized, in tensile measurement, by high elongation-to-break, high tensile strength and modulus and a high glass transition temperature are prepared from a mixture of a prepolymer consisting essentially of glycidyl methacrylate, methyl methacrylate, and methacrylonitrile or acrylonitrile and a diphenol crosslinking agent.

THE INVENTION

This invention relates to self-crosslinking, dry, thermosettable molding powders suitable for rapid curing during processing as by compression and injection molding and applicable to the production of rigid, tough, structural materials as, for instance, automobile body panels, electrical appliance housings, boat construction, storage tanks, conduits, particularly those for the transmission of heated fluids, etc., and to molded articles produced therefrom.

The thermosets of this invention, after molding, have a glass transition temperature above 90° C., preferably about 120° C. At room temperature (20°–25° C.) these moldings exhibit, in tensile measurement, a strength in the range of about 6,000 to about 12,000 p.s.i. or higher, a modulus in the range of about 400,000 to about 700,000 p.s.i. or higher and elongation-to-break in the range of about 2 to about 5 percent or higher.

Glass transition temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g. about 1 cycle per second.

(I) Composition of the prepolymer

The prepolymer has at least three constituent monomers and, except for limited substitution as hereinafter noted, has the following basic composition:

|  | Wt. percent |
|---|---|
| Glycidyl methacrylate | 15–35 |
| Methacrylonitrile | 10–30 |
| Methyl methacrylate, balance. |  |

Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than ⅓ thereof, may be replaced with styrene, vinyl acetate or a different ester of acrylic or methacrylic acid and a monohydric alcohol, preferably a $C_2$–$C_4$ alcohol, e.g. ethyl acrylate, butyl acrylate, butyl methacrylate, etc. This substitute should not exceed about 15 weight percent of the total monomers used to form the prepolymer and preferably does not exceed 10 percent of the same. In the case of the $C_4$ substitutes, this component preferably does not exceed ⅕ of the methyl methacrylate. The substitutes mentioned in this paragraph, with the exception of styrene, increase the flexibility of the polymer, i.e. the elongation-to-break factor, and decrease the softening point (glass transition temperature).

(II) Properties of the prepolymer

The prepolymer has an average molecular weight in the range of about 1,500 to about 16,000 preferably about 4,000 to about 15,000, and more preferably about 4,000 to about 12,000, as determined by vapor phase osmometry using methyl ethyl ketone as solvent. Less than about 5% of the molecules thereof should have a molecular weight below about 1,000.

The prepolymer has a softening point above 25° C., preferably in the range of about 50° to about 130° C.

(III) Preparation of the prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 wt. percent of the combined monomer weight. Conventional free radical initiators are suitable for this purpose, e.g. acylperoxides, peresters, and azo compounds. Specific materials which have been used successfully include 2,2′-azobis (2-methyl propionitrile) hereinafter termed AIBN, benzoyl peroxide, t-butyl perbenzoate and t-butyl peroxypivalate.

As aforementioned, the reaction is carried out in an inert solvent, e.g. toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g. dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner: The reaction solution is further diluted with additional solvent until the prepolymer comprises about 20–30 wt. percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100—Rohm & Haas Co.) have been found quite satisfactory. To carry out suspension polymerization, the monomer mixture is added to cooled (about 0° C.) 0.1% solution of polyvinyl alcohol in water. The mixture is stirred rapidly and the initiator added over a period of about 30 minutes. The temperature of the reaction mixture is then controlled to remain between 55°–60° C. for six to eight hours. After cooling to room temperature, the polymer is collected by filtration. Because the polymerization must be carried out below 65° C., only the initiators which are an efficient source of free radicals below this temperature may be used. Suitable initiators for suspension polymerization include t-butyl peroxypivalate and diisopropyl peroxycarbonate. The molecular weight of the prepolymer can be controlled by using 0.1 to 5 percent (based on monomer weight) of a chain transfer agent such as lauryl mercaptan.

(IV) Crosslinking agent

The crosslinking agent used in this invention is a diphenol. Suitable diphenols include, but not by way of limitation, Bisphenol A, 2,7-dihydroxy naphthalene, 4,4'-sulfonyl diphenol, 1,1' - bis - (4 hydroxy phenyl) - cyclohexane, O,O' - Bisphenol, bis - (4 - hydroxy phenyl)-methane, hydroquinone, etc. The diphenols suitable for this purpose have molecular weights in the range of about 110 to about 500. They consist essentially of carbon, hydrogen and oxygen and may have substituents which do not interfere with crosslinking reaction, e.g. sulfonyl groups, nitro groups, alkylthio groups and halogens.

The crosslinking agent is employed in sufficient quantity to provide 0.90 to 1.05, preferably about 0.95 to 1.0 hydroxyl groups for every epoxy group in the molding powder mixture. A hydroxyl to epoxide ratio within the preferred range has been found to give the best combination of strength properties and glass transition temperature.

(V) Catalyst

A catalyst is employed in the molding powder mix to facilitate the crosslinking reaction. Suitable catalysts include benzyl dimethylammonium bis(o-phenylenedioxy) phenyl siliconate, N,N'-dimethyl benzyl amine, imidazole, 2 - ethyl - 4 - methyl imidazole, BF₃·MEA (boron-trifluoride monoethyl amine complex), tetra butyl ammonium iodide, trimethylbenzyl ammonium chloride, stearyldimethylbenzyl ammonium chloride.

(VI) Additive

In the method of this invention, there is advantageously added to the molding powder mix a minor amount of reactive diluents to lower the melt viscosity thereof. This reactive diluent must be difunctional, liquid at 100° C. and above, and miscible with the prepolymer and crosslinking agent at 100° C. or below. It will comprise about 0.1 to about 5 wt. percent of the molding powder.

In the preferred embodiment, the reactive diluent is a diepoxide having a molecular weight in the range of about 200 to about 1,000 and viscosities at 100° C. of less than 50 poises.

The diepoxide may be either an aromatic diepoxide, an aliphatic diepoxide or a cycloaliphatic diepoxide. These diepoxides consist essentially of carbon, hydrogen and oxygen and may have substitutes which do not interfere with the crosslinking reaction, e.g. sulfonyl groups, nitro groups, alkylthio groups and halogens.

It is also within the scope of this invention to use minor amounts, e.g. 0.1 to 5 wt. percent of molding powder, of a nonreactive diluent, e.g. isopropyl azelate, dioctyl phthalate, etc. Such nonreactive diluents advantageously have molecular weight in the range of about 200 to about 1,000 and viscosity at 100° C. of less than 50 poises.

Typical examples of reactive diluents include diglycidyl esters of polybasic or dibasic acids, as disclosed in U.S. Pat. No. 2,866,767; diglycidyl ethers of dihydric phenols as disclosed in U.S. Pat. No. 2,866,767; diglycidyl ethers of dihydric phenols as disclosed in U.S. Pats. Nos. 2,467,171; 2,506,486; 2,640,037 and 2,841,595; diglycidyl ethers of diols as disclosed in U.S. Pats. Nos. 2,538,072 and 2,581,464 and diepoxides obtained by peracid epoxidation of dienes. Although the diepoxides are to be preferred for the present invention, low viscosity polyepoxides may also be advantageously used.

Suitable aromatic diepoxides are commercially available. These include commercially available epoxide resins of the Bisphenol-A-epichlorohydrin type, each of which is represented by the following formula:

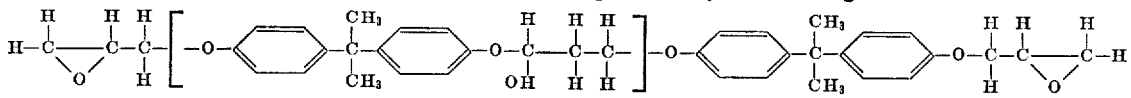 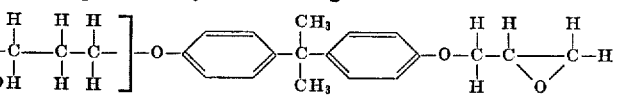

These resins have the following typical properties:

| Trademark [1] | Melting range, °C. | Viscosity in poise at 25° C. | Epoxide equivalent [2] | Equivalent weight [3] | Molecular weight average | n in the Formula [5] average value |
|---|---|---|---|---|---|---|
| Epon 828 | Liquid | 100–150 | 175–210 | 85 | 380 | |
| Epon 834 | Liquid | [4] 3.8–9.0 | 225–290 | 105 | 470 | 0.5 |
| Epon 1001 | 64–76 | [5] 0.8–1.7 | 450–525 | 130 | 900 | 2.0 |

[1] Shell Chemical Co.—In Europe the trade name "Epikote" followed by the same figures.
[2] Gram of resin containing 1 g. equivalent of epoxide.
[3] Gram of resin required to esterify completely 1 mole of a monobasic acid, e.g. 280 grams of a C₁₈ fatty acid.
[4] Available as a 70% solution in butyl carbitol.
[5] Available aliphatic diepoxides can be synthesized by methods well known to the art and are also commercially available.

For example, a suitable aliphatic diepoxide may be synthesized in the following manner: to a 2,000 ml., 3-neck flask equipped with stirrer, dropping funnel, thermometer and nitrogen inlet, is added 1 mole of 2,3-butanediol (91.12 gms.) and 4 moles of epichlorohydrin (370.0 gms.). The temperature is maintained at 110° C. while 2 moles sodium hydroxide (80.0 gms.) is added dropwise as a 30% aqueous solution. The rate of addition is regulated so that the reaction mixture remains neutral. After about 3 hours, the organic layer is separated, dried, distilled, and a polymer is recovered. This polymeric product is represented by the following structural formula:

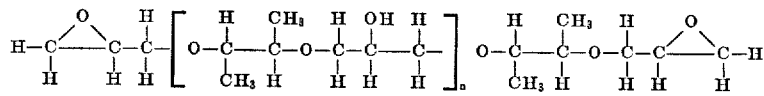

An aliphatic diepoxide, 1,4-butanediol diglycidyl ether, is commercially available. This diepoxide has a viscosity of 15 cps. at 25° C. and an epoxy value of 0.75 eq./100 grams. Cycloaliphatic diepoxides are also commercially available. Aliphatic or cycloaliphatic epoxy additives are recommended where moldings with superior outdoor weathering are needed.

The quantitative employment of the reactive diluent is such that the softening point of the molding powder prior to thermosetting remains above 25° C. and preferably above 40° C. Generally, aliphatic and cycloaliphatic epoxy diluents are used in 1.0 to 15, preferably 5 to 10% weight of the total molding powder. Aromatic epoxy compounds are used in slightly larger amounts.

An alternative to the use of the reactive plasticizer is to increase the amount of low molecular weight molecules in the prepolymer. This is less desirable because of high consumption of expensive free radical initiators and because extreme care must be exercised to avoid undue loss of mechanical properties in the resultant product.

(VII) Preparation of the molding powder mix

The powdered prepolymer, the crosslinking agent, the catalyst, and the reactive or unreactive plasticizer, when used, are dissolved in a suitable solvent, e.g. acetone, benzene, etc., and the solution is thoroughly stirred. The solvent is evaporated under vacuum leaving a rigid foam which is crushed to a fine powder. The powder is further dried under vacuum so that it contains less than one percent of the solvent.

Alternatively, to the prepolymer solution as obtained by polymerization are added crosslinking agent, reactive diluent, if any, and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, crosslinking agent, additives and catalyst and homogenizing by passing through an extrusion mixer or a roll mill.

If desired, refinforcing fillers such as asbestos, glass fibers, clay, calcium carbonate, calcium silicate, etc. may also be incorporated in the molding powders. These fillers are useful to increase the strength, modulus and heat distortion temperature of the finished product.

The powders thus prepared are suitable for use in injection molding, compression molding and transfer molding.

This invention will be more fully understood from the following illustrative examples wherein tensile properties of the molded specimens are by Tensile Test, American Society of Testing & Materials, D-638 (1961) with the overall sample length at 2 inches and the parallel guage section at ½ inch.

The prepolymers in the foregoing examples have softening points between about 50° and about 130° C. with less than 5% of the molecules thereof having molecular weight below 1,000.

EXAMPLE 1

In the following separate tests, the following procedure of preparation and test are used.
(1) mix monomers for prepolymer with reaction initiator, i.e. 2,2′-azobis (2-methyl propionitrile)—hereinafter referred to as AIBN.
(2) drop mixture (1) slowly into equal amount of refluxing toluene (110°–111° C.) under nitrogen atmosphere with stirring.
(3) when addition (2) is complete add 0.1% initiator (basis weight of reactants) in 15 ml. toluene to the stirred reaction mix (2).
(4) continue heating of the reaction mix for 2–3 hours.
(5) dilute reaction mix to 30% solids with acetone.
(6) coagulate prepolymer in 5–7 volumes hexane.
(7) recover prepolymer precipitate and dry same.
(8) mix resultant prepolymer powder with crosslinking agent (diphenol) and catalyst (silicate amine) in acetone.
(9) evaporate acetone under vacuum.
(10) mold (pressure 1500 p.s.i.).

The materials for preparing the moldings and the test results of such moldings are set forth in the following table:

TABLE I.—EFFECT IN CHANGE OF DIPHENOL

| Number | Prepolymer composition, percent | | | | Molding powder | | | Cure | | | Properties | | | |
|---|---|---|---|---|---|---|---|---|---|---|---|---|---|---|
| | GMA[1] | MAN[2] | MMA[3] | AIBN | Prepolymer, grams | Cross-linking agent | Stoichiometry | Catalyst | Temperature, °F. | Time, min. | $T_s$,[4] p.s.i. | $T_e$,[5] percent | $T_m$,[6] p.s.i. | $T_g$,[7] °C. | $T_g$ P.C.,[8] °C. |
| 1 | 35 | 20 | 45 | 2 | ⁹15 | 2.8 g. 2,7-dihydroxy naphthalene | 1.0 | Silicate[10] amine | 390 | 30 | 9,700 | 2.3 | 5.6×10³ | 120 | 145 |
| 2 | 35 | 20 | 45 | 2 | ⁹15 | 4.4 g. 4,4′-sulfonyl diphenol | 1.0 | do | 390 | 30 | 9,500 | 2.8 | 4.4×10³ | | 135 |
| 3 | 35 | 20 | 45 | 2 | ⁹15 | 4.8 g. 1,1-Bis-(4 hydroxy phenyl) cyclohexane | 1.0 | do | 390 | 30 | 9,800 | 4.4 | 6.2×10³ | 107 | 140 |
| 4 | 35 | 20 | 45 | 2 | ⁹15 | 4.7 g. Bisphenol A | 1.0 | do | 390 | 30 | 11,600 | 4.9 | 6.4×10³ | 120 | 135 |
| 5 | 35 | 20 | 45 | 2 | ⁹15 | 4.0 g. Bisphenol A | 1.0 | do | 390 | 30 | 9,400 | 1.5 | 6.4×10³ | 120 | 140 |
| 6 | 35 | 20 | 45 | 2 | ⁹15 | 3.2 g. 0,0′-bisphenol | 1.0 | do | 390 | 30 | 11,000 | 2.8 | 6.8×10³ | 116 | 140 |
| 7 | 35 | 20 | 45 | 2 | ⁹15 | 3.5 g. bis-(4-hydroxy phenyl)-methane | 1.0 | do | 390 | 30 | 12,400 | 3.8 | 6.0×10³ | 130 | 140 |
| 8 | 35 | 20 | 45 | 2 | ⁹15 | 1.9 g. hydroquinone | 1.0 | do | 390 | 30 | 11,000 | 2.8 | 5.6×10³ | 115 | 125 |
| | | | | | | 5.2 g. Bisphenol A, 1.2 g. vinylcyclohexene diepoxide | | | | | | | | | |

[1] Glycidyl methacrylate. [2] Methacrylonitrile. [3] Methyl methacrylate. [4] Tensile strength. [5] Tensile elongation-to-break. [6] Tensile modulus. [7] Glass transition temperature. [8] Glass transition temperature—Post Cure-sample maintained at 190° C. for 2 additional hours. [9] Grams. [10] Benzyldimethylammonium bis (o-phenylenedioxy phenyl siliconate.

EXAMPLE 2

Additional moldings are prepared to illustrate the results of change in average molecular weight of the prepolymer. The procedure of preparation is that used in Example 1. The materials used in preparing these moldings and the test results of these moldings are set forth in the following table:

TABLE II.—EFFECT OF PREPOLYMER MOLECULAR WEIGHT

| | Prepolymer composition | | | | | Molding powder | | | Cure | | | Properties | | | |
|---|---|---|---|---|---|---|---|---|---|---|---|---|---|---|---|
| Number: | Average molecular weight | GMA,[1] grams | MAN,[2] grams | MMA,[3] grams | AIBN, grams | Pre- poly- mer, grams | Cross-linking agent | Stoi- chiom- etry | Catalyst | Tem- pera- ture, percent | Time, min. | Ts,[4] p.s.i. | Te,[5] percent | Tm,[6] p.s.i. | Tg,[7] °C. |
| 9 | 14,200 | [8]262 | 150 | 338 | 2 | 15 | 4 g. bisphenol A | 1.0 | Amine[9] siliconate | 390 | 30 | 10,800 | 3.9 | 5.6×10⁵ | 142 |
| 10 | 10,200 | 262 | 150 | 338 | 3 | 15 | do | 1.0 | do | 390 | 30 | 11,400 | 4.6 | 5.5×10⁵ | 140 |
| 11 | 6,000 | 175 | 100 | 225 | 10 | 15 | do | 1.0 | do | 390 | 30 | 11,500 | 4.8 | 5.4×10⁵ | 140 |
| 12 | 4,000 | 150 | 262 | 338 | 30 | 15 | do | 1.0 | do | 390 | 30 | 11,300 | 4.7 | 5.4×10⁵ | 138 |
| 13 | 2,100 | 70 | 40 | 90 | 20 | 15 | do | 1.0 | do | 390 | 30 | 7,800 | 2.8 | 5.0×10⁵ | 125 |
| 14 | 1,600 | 70 | 40 | 90 | 30 | 15 | do | 1.0 | do | 390 | 30 | 6,100 | 2.0 | 4.6×10⁵ | 115 |

[1-7] See footnotes bottom of Table I. [8] Grams. [9] Benzyldi methylammonium bis (0—phenylene dioxy) phenyl siliconate.

EXAMPLE 3

Additional moldings are prepared to illustrate the results of change in stoichiometry of crosslinking agent relative to prepolymer in molding powder. The procedure of preparation is that used in Example 1. The materials used in preparing these moldings and the test results of these moldings are set forth in the following table:

TABLE III.—EFFECT OF VARYING RELATIVE PROPORTIONS OF PREPOLYMER AND CROSSLINKING AGENT

| | Prepolymer composition, percent | | | | Molding powder | | | | Cure | | Properties | | | |
|---|---|---|---|---|---|---|---|---|---|---|---|---|---|---|
| Number: | GMA[1] | MAN[2] | MMA[3] | AIBN | Pre- poly- mer, grams | Cross-linking agent | Stoichiometry | Catalyst | Tem- pera- ture, °F. | Time, min. | Ts,[4] p.s.i. | Te,[5] per- cent | Tm,[6] p.s.i. | |
| 15 | 35 | 20 | 45 | 2 | [8]15 | 2.0 g. Bisphenol A | 50% of theoretical | 1% of amine[9] siliconate | 390 | 30 | 10,100 | 2.3 | 5.8×10⁵ | |
| 16 | 35 | 20 | 45 | 2 | [8]15 | 3.0 Bisphenol A | 75% of theoretical | do | 390 | 30 | 10,800 | 2.6 | 6.6×10⁵ | |
| 17 | 35 | 20 | 45 | 2 | [8]15 | 3.6 Bisphenol A | 90% of theoretical | do | 390 | 30 | 12,200 | 4.0 | 5.6×10⁵ | |
| 18 | 35 | 20 | 45 | 2 | [8]15 | 4.4 Bisphenol A | 110% of theoretical | do | 390 | 30 | 10,000 | 2.3 | 6.0×10⁵ | |

[1-9] See footnotes bottom of Table II.

EXAMPLE 4

The preceding examples are repeated with the sole difference that an equimolar amount of acrylonitrile is substituted for the methacrylonitrile in the prepolymer.

EXAMPLE 5

The procedure of Examples 1–3 are repeated with the sole difference that in separate tests 25%, 50% and 75% of the methacrylonitrile in the prepolymer is replaced with an equimolar amount of acrylonitrile.

EXAMPLE 6

The preceding examples are repeated with the sole difference that 25% of the methyl methacrylate in the prepolymer is replaced with an equimolar amount of styrene.

EXAMPLE 7

The preceding examples are repeated with the sole difference that 15% of the methyl methacrylate in the prepolymer is replaced with an equimolar amount of ethyl acrylate.

EXAMPLE 8

The preceding examples are repeated with the sole difference that 5% of the methyl methacrylate in the prepolymer is replaced with an equimolar amount of butyl methacrylate.

EXAMPLE 9

The preceding examples are repeated with the sole difference that 5% of the methyl methacrylate in the pre-polymer is replaced with an equimolar amount of vinyl acetate.

EXAMPLE 10

The procedures of the preceding examples are repeated with the sole difference that the molding powder mix contains about 3 wt. percent isopropyl azelate.

EXAMPLE 11

The procedures of the preceding examples are repeated with the sole difference that the molding powder contains about 3 wt. percent dioctyl phthalate.

EXAMPLE 12

The procedure of Example 1 is repeated except that separate tests are conducted using 1.0, 2.5, 5.0, 10.0, and 15.0 weight percent of the diepoxide, basis total weight of the molding powder.

EXAMPLE 13

The procedures of Example 11 are repeated except that in separate tests equimolar amounts of 1,4-butanediol diglycidyl ether, di-3,4-epoxy cyclohexyl adipate, Epon 828 (hereinbefore described), and resorcinol diglycidyl ether are separately employed in lieu of vinylcyclohexene diepoxide.

The foregoing examples are illustrative of the invention defined in the appended claims. Those skilled in the art will be aware that modifications may be made therein without departing from the scope of the invention as set forth in the claims.

We claim:

1. A molding powder which comprises an intimate mixture of
   (a) a copolymer
      (1) consisting of about 15 to about 35 weight percent glycidyl methacrylate, about 10 to about 30 weight percent acrylonitrile or methacrylonitrile and a remainder consisting essentially of methyl methacrylate, and
      (2) having average molecular weight in the range of about 1,500 to about 16,000, softening point about 25° C., and epoxide groups in its molecular structure resultant of inclusion of said glycidyl methacrylate as a constituent monomer thereof, and
   (b) a diphenol having molecular weight in the range of about 110 to about 500 consisting essentially of carbon, hydrogen and oxygen, said diphenol being present in sufficient quantity to provide about 0.90 to about 1.05 hydroxyl groups per each epoxy group in said mixture.

2. A molding powder in accordance with claim 1 wherein said copolymer has average molecular weight in the range of about 4,000 to about 15,000.

3. A molding powder in accordance with claim 1 wherein said copolymer has average molecular weight in the range of about 4,000 to about 12,000.

4. A molding powder in accordance with claim 1 wherein less than 5% of the molecules of said copolymer have molecular weight below about 1,000.

5. A molding powder in accordance with claim 1 wherein said molding powder contains about 0.1 to about 5 weight percent of a nonreactive diluent having molecular weight in the range of about 200 to about 1,000 and viscosity at 100° C. of less than 50 poises.

6. A molding powder which comprises an intimate mixture of
   (a) a copolymer
      (1) consisting of about 15 to about 35 weight percent glycidyl methacrylate, about 10 to about 30 weight percent acrylonitrile or methacrylonitrile and a remainder consisting essentially of methyl methacrylate, and
      (2) having average molecular weight in the range of about 4,000 to about 12,000 with less than 5 percent of the molecules thereof having molecular weight below 1,000, softening point above 25° C. and epoxide groups in its molecular structure resultant of inclusion of said glycidyl methacrylate as a constituent monomer thereof, and
   (b) a diphenol having molecular weight in the range of about 110 to about 500 and consisting essentially of carbon, hydrogen and oxygen, said diphenol being present in sufficient quantity to provide 0.95 to 1.0 hydroxyl groups per each epoxy group in said mixture.

7. A molding powder which comprises an intimate mixture of
   (a) a copolymer
      (1) consisting of about 15 to about 35 weight percent glycidyl methacrylate, about 10 to about 30 weight percent acrylonitrile or methacrylonitrile and a remainder consisting essentially of methyl methacrylate, and
      (2) having average molecular weight in the range of about 1,500 to about 16,000, softening point above 25° C., and epoxide groups in its molecular structure resultant of inclusion of said glycidyl methacrylate as a constituent monomer thereof, and
   (b) a diphenol having molecular weight in the range of about 110 to about 500 and consisting essentially of carbon, hydrogen and oxygen, and
   (c) a diepoxide having molecular weight in the range of about 200 to about 1,000 and viscosity at 100° C. of less than 50 poises, said diphenol being present in sufficient quantity to provide about 0.90 to about 1.05 hydroxyl groups per each epoxy group in said mixture and said diepoxide comprising between about 1.0 and about 15.0 weight percent of said mixture.

8. A molding powder in accordance with claim 7 wherein said diepoxide is vinylcyclohexene diepoxide.

9. A molding powder in accordance with claim 7 wherein said diepoxide comprises between 5 and 10 weight percent of said mixture.

10. A molded article having glass transition temperature about 90° C., tensile strength above about 6,000 p.s.i., tensile modulus above about 400,000 p.s.i., and tensile elongation-to-break above about 2 percent and formed from a molding powder which comprises an intimate mixture of
   (a) a copolymer
      (1) consisting of about 15 to about 35 weight percent glycidyl methacrylate, about 15 to about 30 weight percent acrylonitrile or methacrylonitrile, and a remainder consisting essentially of methyl methacrylate, and
      (2) having average molecular weight in the range of about 1,500 to about 16,000, softening point above 25° C., and epoxide groups in its molecular structure resultant of inclusion of said glycidyl methacrylate as a constituent monomer thereof, and
   (b) a diphenol having molecular weight in the range of about 110 to about 500 and consisting essentially of carbon, hydrogen and oxygen, said diphenol being present in sufficient quantity to provide about 0.90 to about 1.05 hydroxyl groups per each epoxy group in said mixture.

11. A molded article having glass transition temperature above 120° C., tensile strength above 6,000 p.s.i., tensile modulus about 400,000 p.s.i., ad tensile elongation-to-break above 2 percent and formed from a molding powder which comprises an intimate of
   (a) a copolymer
      (1) consisting of about 15 to about 35 weight percent glycidyl methacrylate, about 15 to about 30 weight percent methacrylonitrile, and a remainder consisting essentially of methyl methacrylate,
      (2) having average molecular weight in the range of about 4,000 to about 15,000 with less than 5 percent of the molecules thereof having molecular weight below 1,000, softening point in the range of about 50° C. to 130° C., and epoxide groups in its molecular structure resultant of inclusion of said glycidyl methacrylate as a constituent monomer thereof, and
   (b) a diphenol having molecular weight in the range of about 110 to about 500 and consisting essentially of carbon, hydrogen and oxygen, said diphenol being present in sufficient quantity to provide about 0.90 to about 1.05 hydroxyl groups per each epoxy group in said mixture.

12. A molded article having glass transition temperature above 120° C., tensile strength above 6,000 p.s.i., tensile modulus above 400,000 p.s.i. and tensile elongation-to-break above 2 percent and formed from a molding powder which comprises an intimate mixture of
   (a) a copolymer
      (1) consisting of about 15 to about 35 weight percent glycidyl methacrylate, about 10 to about 30 weight percent methacrylonitrile, and a remainder consisting essentially of methyl methacrylate, (2) having average molecular weight in the range of about 4,000 to about 12,000 with less than 5% of the molecules thereof having molecular weight below 1,000 and epoxide groups in its molecular structure resultant of inclusion of said glycidyl methacrylate as a constituent monomer thereof, and (b) a diphenol having molecular weight in the range of about 110 to about 500 and consisting essentially of carbon, hydrogen and oxygen and being present in sufficient quantity to provide 0.95 to 1.0 hydroxyl groups per each epoxy group in said mixture.

13. A molded article having glass transition temperature above 120° C., tensile strength above about 6,000 p.s.i., tensile modulus above about 400,000 p.s.i., and tensile elongation-to-break above 2 percent and formed from a molding powder which comprises an intimate mixture of (a) a copolymer
(1) consisting of about 15 to about 35 weight percent glycidyl methacrylate, about 10 to about 30 weight percent acrylonitrile or methacrylonitrile, and a remainder consisting essentially of methyl methacrylate,
(2) having average molecular weight in the range of about 1,500 to about 16,000 with less than 5% of the molecules thereof having molecular weight below 1,000 and epoxide groups in its molecular structure resultant of inclusion of said glycidyl methacrylate as a constituent monomer thereof, and (b) a diphenol having molecular weight in the range of about 110 to about 500 and consisting essentially of carbon, hydrogen and oxygen, and (c) a diepoxide having molecular weight in the range of about 200 to about 1,000, viscosity at 100° C. of less than 50 poises, and consisting essentially of carbon, hydrogen and oxygen, said diphenol being present in sufficient quantity to provide about 0.90 to about 1.05 hydroxyl groups per each epoxy group in said mixture and said diepoxide comprising about 1.0 to about 15.0 weight percent of the mixture.

14. A molded article having glass transition temperature above 120° C., tensile strength above 6,000 p.s.i., tensile modulus above 400,000 p.s.i., and tensile elongation-to-break above 2 percent and formed from a molding powder which comprises an intimate mixture of (a) a copolymer
(1) consisting of about 15 to about 35 weight percent glycidyl methacrylate, about 10 to about 30 weight percent methacrylonitrile, and a remainder consisting essentially of methyl methacrylate,
(2) having average molecular weight in the range of about 4,000 to about 12,000 with less than 5% of the molecules thereof having molecular weight below 1,000, softening point in the range of 50° to 130° C., and epoxide groups in its molecular structure resultant of inclusion of said glycidyl methacrylate as a constituent monomer thereof, and (b) a diphenol having molecular weight in the range of about 200 to about 1,000 and consisting essentially of carbon, hydrogen and oxygen, and (c) a diepoxide having molecular weight in the range of about 200 to about 1,000, viscosity at 100° C. of less than 50 poises, and consisting essentially of carbon, hydrogen and oxygen, said diphenol being present in sufficiently quantity to provide about 0.95 to about 1.0 hydroxyl groups per each epoxy group in said mixture and said diepoxide comprising about 5 to about 10 weight percent of said mixture.

References Cited
UNITED STATES PATENTS

| | | | |
|---|---|---|---|
| 2,787,561 | 4/1957 | Sanders | 260—80.72 |
| 3,247,285 | 4/1966 | Belanger | 260—830 TW |
| 3,317,453 | 5/1967 | MacDonald et al. | 260—80.72 |

LEWIS JACOBS, Primary Examiner

U.S. Cl. X.R.

260—31.8 R, 830 TW